(12) United States Patent
Sowada et al.

(10) Patent No.: US 6,836,707 B2
(45) Date of Patent: Dec. 28, 2004

(54) METHODS AND SYSTEMS FOR DETERMINING HEAVE AND HEAVE RATE OF VESSELS

(75) Inventors: Delroy J. Sowada, Seminole, FL (US); Vernon F. Marsh, Seminole, FL (US); Kenneth S. Morgan, St. Petersburg, FL (US); Michael O. Vaujin, Safety Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/160,515

(22) Filed: May 30, 2002

(65) Prior Publication Data

US 2003/0225491 A1 Dec. 4, 2003

(51) Int. Cl.[7] .............................. G06F 7/00; B60L 3/00; G05D 1/00
(52) U.S. Cl. ................. 701/21; 114/230.1; 114/230.27; 340/984; 73/178 R; 414/138.1; 414/138.3; 166/355; 441/3; 441/21
(58) Field of Search ................................. 701/207, 213, 701/220, 225, 21; 114/230.1, 264–268, 61.2, 230.27, 44, 51, 230.21, 230.19; 414/137.1, 137.8, 137.9, 138.1–138, 139.4, 139.6; 73/178 R, 170.02, 170.03, 170.11, 179.29, 170.31; 166/352–355; 340/958, 984–987; 441/3–4, 21–25; 175/5–6, 24–25, 40

(56) References Cited

U.S. PATENT DOCUMENTS

| | | | |
|---|---|---|---|
| 3,896,755 A | * 7/1975 | Marbury | 114/126 |
| 4,000,646 A | 1/1977 | Mott et al. | 73/170.31 |
| 4,021,019 A | 5/1977 | Sanders | 414/137.7 |
| 4,039,177 A | 8/1977 | Person et al. | 267/126 |
| 4,091,356 A | 5/1978 | Hutchins | 367/12 |
| 4,104,608 A | 8/1978 | Melling et al. | 367/12 |
| 4,210,897 A | 7/1980 | Hutchins | 367/106 |
| 4,236,695 A | 12/1980 | Morrison | 254/277 |
| 4,349,179 A | 9/1982 | Barber | 254/340 |
| 4,448,396 A | 5/1984 | Delago | 254/340 |
| 4,547,857 A | * 10/1985 | Alexander | 700/275 |
| 4,576,517 A | 3/1986 | McCann et al. | 405/195.1 |
| 4,582,014 A | 4/1986 | Patel | 114/125 |
| 4,697,253 A | 9/1987 | Lind et al. | 367/12 |
| 4,932,248 A | 6/1990 | Delignieres | 73/170.29 |
| 4,986,121 A | 1/1991 | Luscombe | 73/170.29 |
| 5,098,226 A | 3/1992 | Venugopal | 405/205 |
| 5,135,327 A | 8/1992 | White et al. | 405/224 |
| 5,190,107 A | 3/1993 | Langner et al. | 166/355 |
| 5,317,542 A | 5/1994 | Konopelski | 367/12 |
| 5,452,674 A | 9/1995 | Melville et al. | 114/122 |
| 5,535,690 A | * 7/1996 | Bystedt et al. | 114/61.2 |
| 5,577,874 A | 11/1996 | Olsen | 414/138.3 |
| 5,894,895 A | 4/1999 | Welsh | 175/5 |
| 6,064,924 A | 5/2000 | Fleischmann | 701/16 |
| 6,216,789 B1 | 4/2001 | Lorsignol et al. | 166/355 |
| 6,382,022 B1 | * 5/2002 | Martinez et al. | 73/178 R |
| 6,390,012 B1 | 5/2002 | Watt et al. | 114/322 |
| 6,505,574 B1 | * 1/2003 | Naud et al. | 114/268 |

* cited by examiner

Primary Examiner—Jacques H. Louis-Jacques
(74) Attorney, Agent, or Firm—Matthew Luxton, Esq.; Armstrong Teasdale LLP

(57) ABSTRACT

A method for determining heave and heave rate for a vessel is described. The vessel includes an inertial navigation system (INS), and sensors for the INS being located at a point A of the vessel, the vessel having a zero heave reference point B, and the described method provides heave and heave rate at a point C of the vessel. The method includes determining reference coordinates for points A, B, and C of the vessel, generating a velocity signal representative of a velocity at a point on the vessel, generating a heave rate signal based upon the velocity signal, and generating a heave based upon the heave rate signal.

15 Claims, 4 Drawing Sheets

METHODS AND SYSTEMS FOR DETERMINING HEAVE AND HEAVE RATE OF VESSELS

BACKGROUND OF THE INVENTION

This invention relates generally to navigation of vessels, and more specifically, to determination of and compensation for heave and heave rates for vessels.

Heave is the vertical distance of motion relative to sea-level. and a vertical motion of a vessel riding waves at sea, relative to sea level, is generally referred to as heave rate. For a vessel riding the waves, the vertical motion is simply an oscillation about sea-level, having a zero long-term average of earth-relative displacement and velocity. Heave and heave rate values are utilized in controlling various operations, such as, to control a tether to a submerged diver, submarine, and for other underwater operations, as well as to define a motion of a sonar transmitter, and to define deck motion at a point for landing operations of a helicopter.

Some known inertial systems are used to measure heave and heave rate. However, a vertical channel of a pure inertial system typically has divergent errors. A global positioning satellite (GPS) system can be used to compensate for such divergence, but the GPS system itself may introduce errors into the heave and heave rate determinations.

BRIEF SUMMARY OF THE INVENTION

In one aspect, a method for determining heave and heave rate for a vessel is provided. In an exemplary embodiment, the vessel is equipped with an inertial navigation system (INS), and sensors for the INS are located at a selected point of the vessel, e.g. point A. The vessel further has a zero heave reference point B. The method is utilized to determine heave and heave rate at a point C of the vessel, where point C is a different point than points A and B. More particularly, the method comprises determining reference coordinates for points A, B, and C of the vessel, generating a signal representative of velocity at a point on the vessel, generating a heave rate signal based upon the velocity signal, and generating a heave signal based upon the heave rate signal.

In another aspect, an inertial navigation system (INS) for determining a heave and a heave rate for a vessel is provided. The INS system comprises, in an exemplary embodiment, a main unit, a user interface, a global positioning satellite (GPS) receiver, and a sensor unit. The sensor unit comprises an inertial sensor assembly located at a point A of the vessel. The main unit comprises interfaces for communication of inertial navigation information to other control systems on the vessel. The INS is configured to determine reference coordinates for points A, B, and C of the vessel, a heave, and a heave rate for the vessel.

In a further aspect, a filter is provided which comprises a first stage and a second stage. The first stage is configured to generate an output signal representative of a heave rate based, at least in part on a velocity signal input. The second stage is configured to generate an output signal representative of heave by filtering the heave rate signal output by the first stage.

DETAILED DESCRIPTION OF THE INVENTION

The features and principles are described herein relative to an exemplary embodiment thereof. It will be apparent to those skilled in the art that numerous variations and modifications may be made to the exemplary embodiment without departing from the spirit and scope. The systems and methods are not limited to the specific embodiments described herein. Components of each system and method can be practiced independent and separate from other components and methods. Each system and method also can be used in combination with other components, systems, and methods.

A system that provides an accurate representation of heave and heave rate of a vessel, as measured by a strap-down inertial system (INS), is described in detail below. Generally, the system utilizes digital band pass filtering to remove long-term bias errors due to specific force measurement and modeling of local gravity. In addition, the system performs lever-arm corrections to define velocity at points of the vessel other than points at which sensors of the INS are located, using measured values of angular velocity of the vessel. As used herein, the term vessel means any structure which may incorporate a system for determining heave and heave rate including, but not limited to, ships, boats, submarines, submersibles, marine vessels, unmanned water vehicles, military vessels, amphibious aircraft, torpedoes, and any other watercraft in a marine environment.

Figure 1:
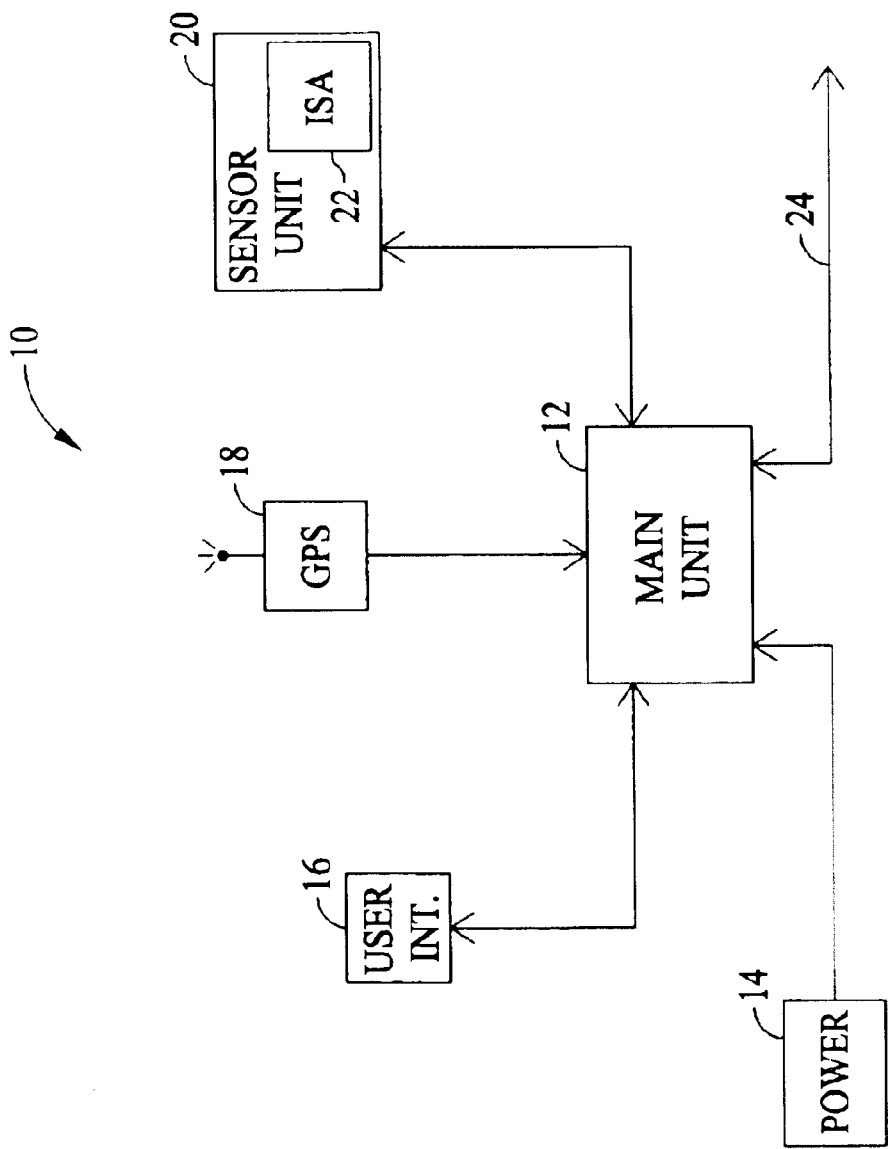
FIG. 1 is a block diagram of an inertial navigation system.

FIG. 1 is a block diagram of an inertial navigation system (INS) 10 for marine use. System 10 includes a main unit 12 to which is connected a power supply 14. Also connected to main unit 12 are a user interface unit 16, a global positioning satellite (GPS) receiver 18, and a sensor unit 20 which includes an inertial sensor assembly (ISA) 22. Main unit 12 is configured with interfaces 24 to provide inertial navigation information to, for example, a main navigation system within a vessel, or other systems within a vessel that may utilize navigation information. ISA 22, within sensor unit 20 incorporates gyroscopes and accelerometers (not shown) and sensor unit 20 includes gyroscope electronics. In one embodiment, the gyroscope is a laser gyro. User interface unit 16 provides a user interface, including a display and keypad (neither shown) for display of inertial information and alteration of display modes and operating parameters.

Figure 2:
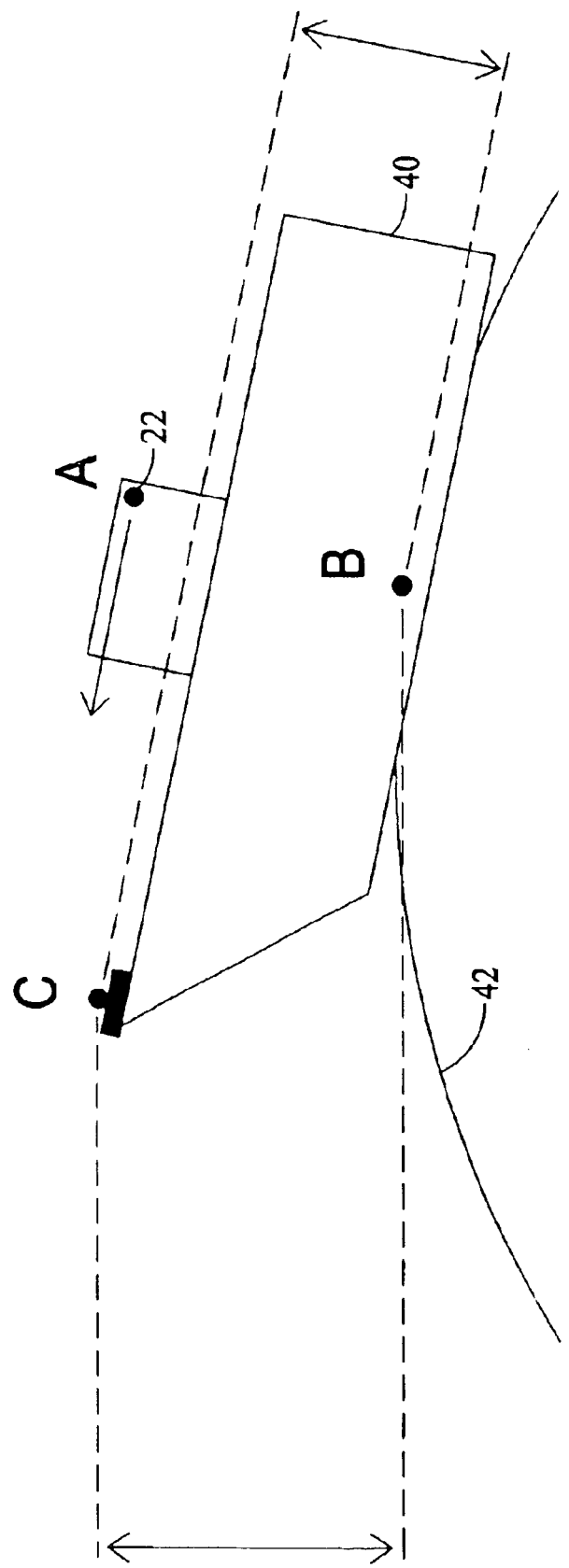
FIG. 2 is a diagram illustrating factors utilized in determining heave and heave rate.

FIG. 2 is a diagram of a vessel 40 illustrating a location of ISA 22, herein denoted as point A. Point B is referred to as a heave zero reference point. In one embodiment, point B is chosen to be at a mean water line and at a mean center of rotation of vessel 40. One purpose for designating point B is to compensate for a static tilt of vessel 40. Another purpose for the designation is compensation for how high or low vessel 40 is riding in water 42 due to buoyancy. Point C is a point at which it is desirable to know heave and heave rate for vessel 40, for example, where a winching system is connected to a submersible (not shown).

To determine heave and heave rate for vessel 40, reference coordinates are defined. Specifically, body frame coordinates are defined with respect to a bow, a starboard side and a belly of vessel 40. Local level frame coordinates are defined as north, east, and down. $C_B^L$ is a transformation direction cosine matrix that redefines a vector expressed in body frame coordinates into a vector expressed in local level coordinates. For transformation matrices, the subscript indicates the frame the vector is to be taken from, and the superscript indicates the frame the vector is to be taken to. Therefore referring to the above transformation direction cosine matrix, the "B" refers to body frame coordinate vectors, and "L" refers to local level frame vectors.

A lever arm from point A to point C is given as $R_{AC}$, and a lever arm from point A to point B is given as $R_{AB}$. Lever arms, as known in the art, are vectors representing distance and direction. Lever arms herein are defined in body frame coordinates. Referring to FIG. 2, a lever arm from point B to point C can be described as:

$$R_{BC} = R_{AC} - R_{AB}. \quad \text{Eq (1)}$$

Velocity of vessel 40 is known at point A, based upon data from INS 10. Therefore velocity at point C is calculated as:

$$V_C^L = V_A^L + C_B^L(\omega^B \times R_{AC}) \quad \text{Eq (2)}$$

Superscripts on the above variables indicate which frame, body coordinates or local level coordinates, the variable is defined in. Therefore, $V_A^L$ is the local level velocity at point A, $V_C^L$ is the local level velocity at point C, and $\omega^B$ is the body frame angular rate of vessel 40.

In one embodiment, inertial navigation system (INS) 10 includes a filter module that provides heave and heave rate by filtering an altitude channel of INS 10. In at least some known applications, the altitude channel of INS 10 is augmented with external measurements from a global positioning satellite (GPS), for example. Other applications provide augmentations for the altitude channel of INS 10 from one or more of GPS, pressure altitude, or simply loosely slaving the altitude channel of INS 10 to zero (i.e. sea-level altitude).

To remove bias errors, such as bias errors from altitude and altitude rate, high pass filtering is used to arrive at signals representative of heave and heave rate, thereby avoiding the errors associated with GPS, baro-altimeter or other measurement systems.

Figure 3:
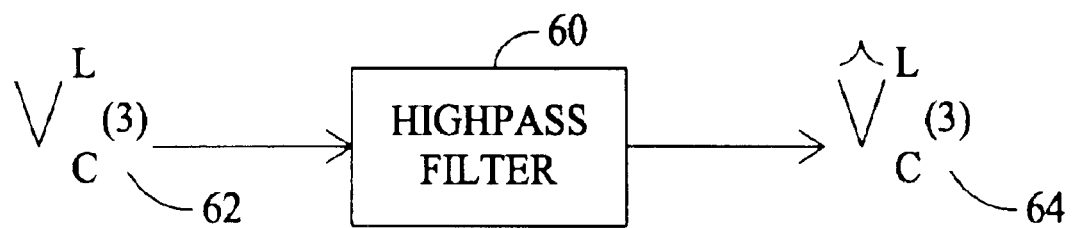
FIG. 3 is a block diagram of a filter.

Referring to FIG. 3 a filter module within INS 10 is shown. A third element of $V_C^L$, referred to herein as $V_C^L(3)$, is input into a high pass filter 60 to remove any DC or very low frequency components. Providing an input 62 of $V_C^L(3)$ to filter 60 results in an output 64 of $\hat{V}_C^L(3)$. Output 64, the signal that results from filtering through filter 60, is the heave rate of vessel 40. Heave rate is therefore stated mathematically as follows:

$$\text{HeaveRate} = \hat{V}_C^L(3). \quad \text{Eq (3)}$$

In one embodiment of system 10 (shown in FIG. 1), a 200 Hz attitude rate is utilized in conjunction with Eq (2) which contains an inherent white noise variance of 6.0e–6 (radians)$^2$/(second)$^2$.

A change in vertical position of vessel 40, that is, heave or heave distance, is then calculated by integration of the heave rate signal. An example calculation for heave signal, utilizing a heave rate signal follows:

$$\text{Heave} = \sum \hat{V}_C^L(3) \Delta t + C_B^L R_{BC}(3)_{t_0}. \quad \text{Eq (4)}$$

In Eq (4), the first term, $$\sum \hat{V}_C^L(3) \Delta t,$$

represents heave rate integration, and the second term, $C_B^L R_{BC}(3)_{t_0}$, is the initial condition on the integration. The initial condition represents a local level vertical distance between point B and point C, which was valid at time $t_0$, a starting time of the integration.

Since white noise is inherent in the attitude rate, as determined by INS 10, output 64 of high pass filter 60 may be unpredictable when input 62 contains such white noise. It is therefore desirable that the data to be filtered in a for determination of heave and heave rate be as accurate as possible. In the embodiments described herein, the most accurate data is the data for point A. Therefore, an alternative embodiment of a heave algorithm implemented within a filter module in INS 10 is provided which results in a calculation for heave and heave rate with results similar to those described above. This alternative embodiment, illustrated in FIG. 4, introduces less noise.

Figure 4:
FIG. 4 is a block diagram of a filter utilizing a different input than the filter of FIG. 3.

Referring specifically to FIG. 4, high pass filter 70 receives a local level vertical velocity signal at an input 72, the local level vertical velocity is provided from INS 10 at point A, as represented by the input variable in the Figure. In one specific embodiment, local level vertical velocity is a signal provided at 200 Hz. In such an embodiment, a heave rate signal is calculated as:

$$V_C^L(3) = \hat{V}_A^L(3) + [C_B^L(\omega^B \times R_{AC})](3)_{t_k}. \quad \text{Eq (5)}$$

The subscript $t_k$ in the second term of Eq (5) indicates that the term is updated every iteration. Utilizing Eq (4), heave is then calculated as an integration of Eq (5), which follows:

$$\sum V_C^L(3) \Delta t = \sum \hat{V}_A^L(3) \Delta t + [C_B^L R_{BA}(3)_{t_k}] + [C_B^L R_{AC}](3)_{t_k} \quad \text{Eq (6)}$$

The subscript $t_k$ in the second term and in the third term indicates that the term is updated every iteration. Equations 5 and 6 provide signals for heave and heave rate which are similar to those provided by filter 60 (shown in FIG. 3), but with less potential for noise and unpredictable behavior in the filtering process.

Figure 5:
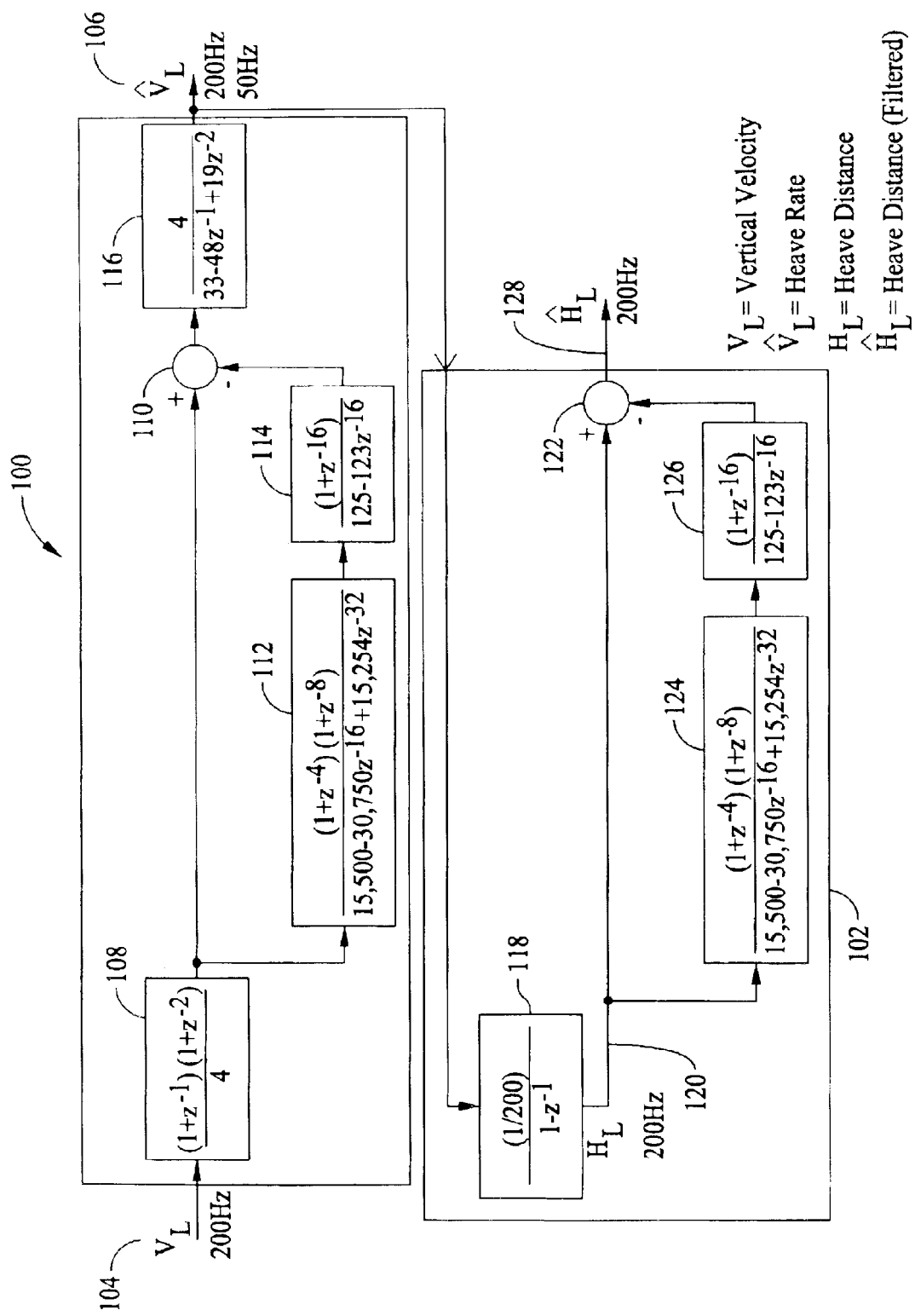
FIG. 5 is a detailed block diagram of two filters, illustrating transfer functions for each filter.

FIG. 5 illustrates a specific embodiment of a filter 100 implemented within INS 10. Filter 100 determines heave rate utilizing vertical velocity, and a filter 102 which determines a filtered heave distance utilizing heave rate. Referring specifically to filter 100, vertical velocity is received at input 104 and heave rate is placed at output 106. Referring specifically to elements within filter 100, a first filter element 108, which has a transfer function of $(1+z^{-1})(1+z^{-2})/4$, receives vertical velocity as input. An output of first filter element 108 is input to both of a positive input of a subtraction element 110 and an input of a second delay element 112. Second delay element 112 has a transfer function of $(1+z^{-4})(1+z^{-8})/(15{,}500-30{,}750z^{-16} + 15{,}254z^{-32})$. An output of element 112 is input to a third delay element 114. Third delay element 114 has a transfer function of $(1+z^{-16})/(125-123z^{-16})$. An output of third delay element 114 is input to a negative input of subtraction element 110. An output of subtraction element 110 is provided to an input of a fourth delay element 116 that has a transfer function of $4/(33-48z^{-1}+19z^{-2})$. Output of fourth delay element 116 is output 106, and therefore the heave rate of vessel 40.

Output of fourth delay element 116, or heave rate is input to filter 102, at a first delay element 118. First delay element 118 has a transfer function of $(1/200)/(1-z^{-1})$. Output of first delay element 118 is heave 120. Heave 120 is input to a positive input of subtraction element 122 and an input of a second delay element 124. Second delay element 124 has a transfer function of $(1+z^{-4})(1+z^{-8})/(15,500-30,750z^{-16}+15,254z^{-32})$. An output of second delay 124 is input to a third delay element 126. Third delay element 126 has a transfer function of $(1+z^{-16})/(125-123z^{-16})$. An output of third delay element 126 is input to a negative input of subtraction element 122. An output of subtraction element 122 is the filtered heave distance of vessel 40.

Utilization of filters 100 and 102 within INS 10, in one embodiment, provide signals with an accuracy of at least 0.1 meter for heave and 0.1 meter per second for heave rate. Filters 100 and 102 further provide a pass band of 0.1 to 2 Hertz and a group delay of less than 25 milliseconds. In the embodiments described, heave has a range of plus to minus four meters.

A particular approach is provided in the elements of filters 100 and 102. An upper edge, of the filters, out to 2 Hertz and above is configured with unity gain, within 0.015 dB, and with anti-aliasing zeros for either 50 or 200 sample per second outputs. Instead of two zeros at 100 Hertz, as is typical in certain known bi-linear transformation second order complex-pole filters, one of the zeros is moved to 50 Hertz. Filters 100 and 102 therefore do not exhibit aliasing errors, due to near 50 and 100 Hertz content, when filter output is utilized at 50 samples per second.

A low-frequency end of filters 100 and 102 is configured as a high pass filter and has unity gain, within about 0.20 dB, at 0.1 Hertz. A ratio of filter break frequency to sampling frequency, raised to the power equal to the number of filter poles, causes small differences in filter coefficients which thereby locates the poles of the filters. Although data from filters 100 and 102 is available at a high sampling rate, the poles are realized in a computation repeated at a slow rate. The purpose of the low-frequency end of filters 100 and 102 is to extract an average value for the signals.

The reduction in processing rate is therefore done in a manner that attenuates signal content that can alias to a near-zero frequency, before the reduction in frequency occurs. An analysis of such a process shows that content near the zeros is removed before an aliasing to a near-zero frequency occurs with the reduction in sampling rate. Further reduction in effect of small differences of large coefficients is to implement the overall transfer function as a cascade of first and second-order sections, rather than implementing as higher order sections.

While the invention has been described in terms of various specific embodiments, those skilled in the art will recognize that the invention can be practiced with modification within the spirit and scope of the claims.

What is claimed is:

1. A method for determining heave and heave rate at a point C on a vessel, the vessel having an inertial navigation system (INS), sensors for the INS being located at a point A on the vessel, the vessel having a zero heave reference point B, said method comprising:

determining body frame coordinates for points A, B, and C;

defining a transformation direction cosine matrix $C_B^L$, which redefines a vector expressed in body frame coordinates into a vector expressed in local level coordinates;

determining local level coordinates for the vessel at points A, B, and C;

determining a lever arm from point A to point C, $R_{AC}$;

calculating a velocity signal representative of a velocity at point C on the vessel, using a known velocity at point A, based on the body frame coordinates and INS sensor measurements for point A, the transformation direction cosine matrix $C_B^L$, and the lever arm according to $$V_C^L = V_A^L + C_B^L(\omega^B \times R_{AC}), \text{ where } V_A^L$$

is the local level velocity at point A, $V_C^L$ is the local level velocity at point C, and $\omega^B$ is the body frame angular rate of the vessel;

generating a heave rate signal based on the velocity signal; and generating a heave signal based upon the heave rate signal.

2. A method according to claim 1 wherein generating a heave rate signal based on the velocity signal comprises filtering a third element of $V_C^L$, $V_C^L$ (3), with a high pass filter to determine a heave rate $\hat{V}_C^L$ (3).

3. A method according to claim 2 wherein generating a heave signal based upon the heave rate signal comprises calculating a heave according to $$\text{Heave} = \sum \hat{V}_C^L(3)\Delta t + C_B^L R_{BC}(3)_{t_0}, \text{ where } \sum \hat{V}_C^L(3)\Delta t,$$

represents heave rate integration, and $C_B^L (3)_{t_0}$, is an initial condition on the integration, the initial condition being a local level vertical distance between point B and point C, which was valid at time $t_0$, the starting time of the integration.

4. A method according to claim 1, wherein generating a heave rate signal based on the velocity signal comprises determining heave rate of the vessel according to $$V_C^L(3) = \hat{V}_A^L(3) + [C_B^L(\omega^B \times R_{AC})](3)_{t_k}, \text{ where } \hat{V}_C^L(3)$$

is a filtered third element of local level velocity at point A, $V_C^L$ (3) is the third element of local level velocity at point C, $\omega^B$ is the body frame angular rate of the vessel, and the subscript $t_k$ indicates that the term is updated every iteration.

5. A method according to claim 4 wherein generating a heave signal based upon the heave rate signal comprises determining a heave according to $$\sum V_C^L(3)\Delta t = \sum \hat{V}_A^L(3)\Delta t + [C_B^L R_{BA}(3)_{t_k}] + [C_B^L R_{AC}](3)_{t_k},$$

where the subscript $t_k$ indicates that the term is updated at every iteration.

6. A method according to claim 1 wherein generating heave rate signal based on the velocity signal comprises filtering the velocity signal according to the transfer function $[(1+z^{-1})(1+z^{-2})/4] \times [4/(33-48z^{-1}+19z^{-2})] = [1-((1+z^{-4})(1+z^{-8})(1+z^{-16})/(15,500-30,750z^{-16}+15,254z^{-32})(125-123z^{-16}))]$.

7. A method according to claim 1 wherein generating a heave signal comprises filtering the heave rate signal according to the transfer function $(1/200)/(1-z^{-1})$.

8. A method according to claim 7 further comprising filtering the heave according to $1-[((1+z^{-4})(1+z^{-8})(1+z^{-16})/(15,500-30,750z^{-16}+15,254z^{-32})(125-123z^{-16})]$.

9. An inertial navigation system (INS) for determining a heave and a heave rate for a vessel, said system comprising:

a main unit;

a user interface unit;

a global positioning satellite (GPS) receiver; and a sensor unit comprising an inertial sensor assembly (ISA), said ISA located at a point A of the vessel, the vessel having a zero heave reference point B, said main unit comprising interfaces for communication of inertial navigation information to other systems on the vessel, said user interface unit comprising a display and keypad, said system configured with body frame coordinates for points A, B, and C, point C being a location at which it is desired to be provided heave and heave rate data, said system configured to define a transformation direction cosine matrix $C_B^L$, which redefines a vector expressed in body frame coordinates into a vector expressed in local level coordinates, determine a lever arm from point A to point C, $R_{AC}$, said system configured to determine local level coordinates for the vessel at points A, B, and C and determine a velocity of the vessel at point C, using a known velocity at point A, based on the body frame coordinates and data received from said ISA, the transformation direction cosine matrix, and the lever arm, velocity being determined according to according to $$V_C^L = V_A^L + C_B^L(\omega^B \times R_{AC}), \text{ where } V_A^L$$

is the local level velocity at point A, $V_C^L$ is the local level velocity at point C, and $\omega^B$ is the body frame angular rate of the vessel, filter the velocity signal to provide a heave rate signal, and integrate the heave rate signal to determine a heave.

10. An INS system according to claim 9 wherein to filter the velocity signal to provide a heave rate signal, said system is configured to filter a third element of $V_C^L$, $V_C^L(3)$, with a high pass filter to determine a heave rate signal, $\hat{V}_C^L(3)$.

11. An INS system according to claim 10, wherein to integrate the heave rate signal to determine a heave, said system is configured to calculate a heave according to $$\text{Heave} = \sum \hat{V}_C^L(3)\Delta t + C_B^L R_{BC}(3)_{t_0}, \text{ where } \sum \hat{V}_C^L(3)\Delta t,$$

represents heave rate integration, and $C_B^L R_{BC}(3)_{t0}$, is an initial condition on the integration, the initial condition being a local level vertical distance between point B and point C, which was valid at time $t_0$, the starting time of the integration.

12. An INS system according to claim 9 wherein said system is provided a velocity of the vessel at point A, and wherein to filter the velocity signal to provide a heave rate signal, said system is configured to determine heave rate of the vessel according to $$V_C^L(3) = \hat{V}_A^L(3) + [C_B^L(\omega^B \times R_{AC})](3)_{t_k}, \text{ where } \hat{V}_A^L(3)$$

is a filtered third element of local level velocity at point A, $V_C^L(3)$ is the third element of local level velocity at point C, $\omega^B$ is the body frame angular rate of the vessel, and the subscript $t_k$ indicates that the term is updated every iteration.

13. An INS system according to claim 12 wherein to integrate the heave rate signal to determine a heave, said system is configured to determine a heave according to $$\sum V_C^L(3)\Delta t = \sum \hat{V}_A^L(3)\Delta t + [C_B^L R_{BA}(3)_{t_0}] + [C_B^L R_{AC}](3)_{t_k},$$

where the subscript $t_0$ indicates that the term is an initial condition and is only calculated once at the start of integration.

14. A filter comprising:

a first stage configured to provide a heave rate signal based upon a velocity signal input according to the transfer function $[(1+z^{-1})(1+z^{-2})/4]\times[4/(33-48z^{-1}+19z^{-2})]=[1-((1+z^{-4})(1+z^{-8})(1+z^{-16})/(15,500-30,750z^{-16}+15,254z^{-32})(125-123z^{-16}))]$; and a second stage configured to provide a heave signal by filtering the heave rate signal output by said first stage according to the transfer function $(1/200)/(1-z^{-1})$.

15. A filter according to claim 14 wherein said second stage is configured to filter the heave signal according to according to the transfer function $1-[(1+z^{-4})(1+z^{-8})(1+z^{-16})/(15,500-30,750z^{-16}+15,254z^{-32})(125-123z^{-16})]$, providing a filtered heave distance signal.

\* \* \* \* \*

UNITED STATES PATENT AND TRADEMARK OFFICE
CERTIFICATE OF CORRECTION

PATENT NO. : 6,836,707 B2
APPLICATION NO. : 10/160515
DATED : December 28, 2004
INVENTOR(S) : Sowada et al.

It is certified that error appears in the above-identified patent and that said Letters Patent is hereby corrected as shown below:

In Background of the Invention, column 1, line 11, delete "sea-level." and insert therefore -- sea-level --.

Signed and Sealed this

Fifth Day of February, 2008

JON W. DUDAS
*Director of the United States Patent and Trademark Office*